Figure 1:
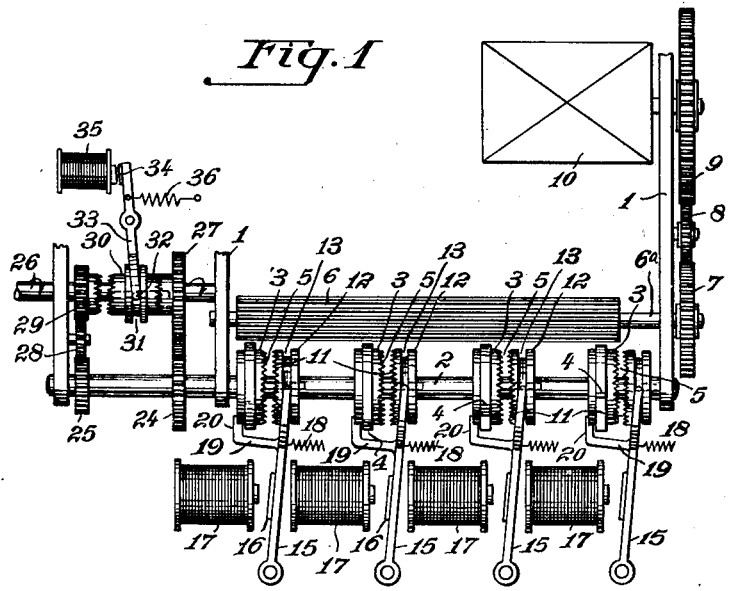
Figure 2:
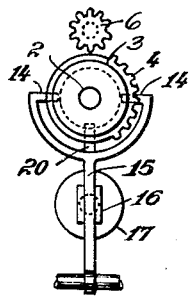

July 4, 1933.  P. MANSEL  1,916,624

AUTOMATIC CONTROL MECHANISM

Filed March 21, 1929

INVENTOR
PAUL MANSEL
BY
ATTORNEYS.

Patented July 4, 1933

1,916,624

UNITED STATES PATENT OFFICE

PAUL MANSEL, OF BERLIN-CHARLOTTENBURG, GERMANY, ASSIGNOR TO SIEMENS & HALSKE, AKTIENGESELLSCHAFT, OF SIEMENSSTADT NEAR BERLIN, GERMANY, A CORPORATION OF GERMANY

AUTOMATIC CONTROL MECHANISM

Application filed March 21, 1929, Serial No. 348,711, and in Germany March 26, 1928.

My invention relates to improvements in automatic control mechanisms, more particularly for computing, sorting or registering machines, in which values entered on cards or continuous tapes or strips of paper by the relative location of perforations or the like, are transmitted to computing, sorting or registering mechanisms. In such apparatus it is known to cause each perforation to energize an electromagnet, which by means of its armature acting on driving or locking mechanisms then operates lever mechanisms or differential gears serving as adjusting means for the computing, sorting, or registering mechanism. It is, however, then necessary to give a specially strong construction to the electromagnets serving as driving means for the intermediate transmission mechanism and the values to be set.

Furthermore, the commercial manufacture of the systems of levers with their numerous parts differing from one another presents certain difficulties and increases the cost of production considerably, as does also the manufacture of the differential gears with sun and planet wheels.

In accordance with my invention these drawbacks are eliminated by providing between one or more continuously revolving spindles or shafts and the computing, sorting or registering mechanisms one or more transmitting devices controlled according to the values to be transmitted, which comprise an axially slidable coupling member and a driving member provided with teeth for the computing, sorting or registering mechanism.

In the drawing affixed hereto and forming part of my specification an embodiment of my invention is illustrated by way of example.

In the drawing,

Fig. 1 shows a control mechanism with four systems of electromagnets and levers, in elevation, and Figs. 2 to 5 show some details of this mechanism.

Like parts are indicated by like numerals of reference in the various figures of the drawing.

Referring to Fig. 1 of the drawing, 1 is the framework of a computing, sorting or registering machine, in which is journaled the spindle or shaft 2. On this spindle 2 are mounted four coupling or clutch members 3 with teeth 4 on the periphery constituting mutilated spur gears and clutch teeth 5 on their faces. These members 3 are loose on the spindle 2, but under certain conditions will take part in its rotation, and are suitably held against sliding thereon axially. Normally, the members 3 are also held against rotation, by means set forth below. Through the peripheral teeth 4 the clutch member 3 meshes at times with an elongated pinion 6 on a shaft 6a which through spur wheels 7, 8 and 9 is connected with the counting mechanism 10, for instance. Opposite the face of the member 3 provided with clutch teeth 5 there is mounted a clutch or coupling member 12 likewise provided with corresponding clutch teeth 11. This member is arranged to rotate with the spindle 2 whenever the latter is rotated, and is also adapted to be moved along it axially. Each of the clutch members 12 is provided with an annular groove 13, which is engaged by projections 14 on one of the pivoted forked levers 15 attached to the armatures 16 of electromagnets 17 and controlled by springs 18.

Figures 3, 4, 5:
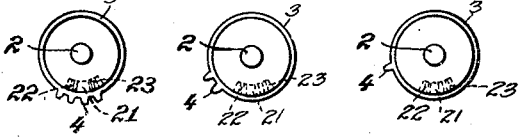

It will be noted that the several members 3 differ as regards the number and the position of their teeth 4. Thus, Fig. 2 may be taken as a representation of the member 3 shown at the extreme left of Fig. 1, such member having eight teeth, in the embodiment illustrated. Figs. 3, 4, and 5, which represent respectively the second, third, and fourth member 3 of Fig. 1 (counting from the left) show members 3 with four teeth, two teeth, and one tooth respectively, and the position of these teeth differs among these several members, in order that a successive operation may be effected in the particular manner set forth hereinafter. It will be understood that the pinion 6 is of sufficient length to mesh with any one of the mutilated spur gears constituted by the teeth 4. The mechanism illustrated in the drawing is intended for co-operation with perforations made in cards or strips of suitable material. For instance, such cards may have perforations indicating the values of the nine digits from 1 to 9, and it is desired that the shaft 6a receive a rotation the extent of which corresponds to the particular digit represented by the perforations in active position at the time. The simplest way would be to have a single perforation for each digit, and to have such perforation in one of nine different positions on the card. The card would then require considerable width in order to accommodate such nine positions or rows. In order to reduce the number of rows, and thus decrease the width of the card, there has been adopted the expedient of expressing the several digit values, or at least some of them, not by a single perforation, but by a combination of two or more perforations. The general type of such "combinational hole records" is well-known in the art, as well as the use of brushes, levers, or other "feelers" or "sensing" devices for interpreting or "reading" such records, see for instance Letters Patent of the United States No. 1,664,539 issued to Bryce on April 3, 1928. Perforated cards in combination with sensing devices are also shown in Hollerith's Letters Patent of the United States, for instance No. 395,782. Mathematical considerations show that the greatest number of combinations at equal intervals with the smallest number of elements can be obtained by using elements the relative values of which are as powers of 2, that is to say, members of the series 1, 2, 4, 8 etc. Thus the digits from 1 to 9 (and in fact, any number from 1 to 15) can be formed by using either singly or in various combinations, four elements having the relative values of 1, 2, 4, and 8. Thus, to represent the nine digits, the perforated card will no longer require nine rows, but only four, whereby the width of the card is reduced and the mechanism co-operating therewith rendered more compact. This is the reason for adopting the relation of 1 to 2 to 4 to 8 for the numbers of the teeth of the four members 3 shown in the drawing. It will be understood that the partial rotations which the pinion 6 receives from the teeth 4 of the members 3 when the latter are rotated by the shaft 2 through the medium of the respective clutch members 12, will correspond in angular extent to the number of teeth on the particular member 3 which is rotating. If the digit values 1, 2, 4, or 8 are to be transferred to the counting or registering mechanism 10, only one of the four members 3 will be set in operation by the card, through sensing mechanism of any well-known or approved character, which sensing mechanism energizes the corresponding electromagnet 17. If other digit values are to be transferred, two or more members 3 will act successively on the pinion 6, during one revolution of the shaft 2. For instance, if the digit value is 3, the two members 3 at the right will be thrown into action, to mesh successively with the pinion 6 during one revolution of the shaft, and impart to it a partial rotation which is the sum of the two partial rotations produced by said members individually. Similarly, if the digit value is 7, the three members 3 having one, two, and four teeth 4 respectively will be thrown into action, to mesh successively with the pinion 6 during one revolution of the shaft 2. The different arrangement or setting of the teeth 4 on the several members 3, as shown in Figs. 2 to 5, is for the purpose of causing them to act successively (and not simultaneously) on the pinion 6 whenever two or more members 3 are in action during the same revolution of the shaft 2. It will be obvious that if the partial rotations effected by the members 3 are to be combined in the ratio of the numbers of their teeth 4, such members must mesh successively with the pinion 4. If the shaft 2 rotates in one direction, addition will result as regards the entries in the counting mechanism 10, while subtraction will result if the shaft 2 is rotating in the opposite direction. Generally speaking, it is not intended to perform operations which would carry the indications of the counting mechanism 10 below zero. The direction in which the shaft 2 rotates is controlled by means described below.

The bifurcated levers 15 are provided with an arm 19 each, which by means of the spring 18 is drawn against the face of the coupling member 3 not provided with teeth. This face of the member 3 is provided with a recess 21 with inclined surfaces 22 and 23 for facilitating the movement of the nose 20 into and out of the recess 21. The parts 3 to 5 and 11 to 21 are repeated four times in the mechanism illustrated.

To the spindle 2 there are also keyed two spur wheels 24 and 25, of which the wheel 24 gears directly with the loose non-slidable spur wheel 27 mounted on a spindle 26 and the spur wheel 25 through the intermediate wheel 28 with the loose non-slidable spur wheel 29 on the spindle 26. The spur wheels 27 and 29 have hubs projecting toward each other and provided with clutch teeth, which are adapted to cooperate with corresponding clutch teeth on the opposite faces of a coupling member 30 located between said spur wheels and adapted to slide on the spindle 26. This member 30 is keyed to the spindle 26 and revolves with it and is also provided with a central annular groove 31 adapted to be engaged by projections 32 of a pivotally mounted forked lever 33. This lever 33 is connected with the armature 34 of an electromagnet 35 and is controlled by a spring 36 tending to pull it away from the magnet. When the magnet 35 is not energized, the coupling member 30 is in engagement with the teeth on the face of the gear wheel 29 and when it is energized with the teeth on the face of the gear wheel 27. The spindle or shaft 26 revolves continuously and transmits this motion to the spindle 2 either through the parts 30, 29, 28, 25 in the same direction or through the parts 30, 27, 24 in the opposite direction of rotation.

The mechanism functions in the following manner: the four electromagnets 17 are from the right to the left coordinated to the combination values 1, 2, 4 and 8, for instance, (that is to say, to give the pinion 6 partial rotations of an angular extent of 1, 2, 4, and 8 respectively) and are individually electrically connected with the selector or feeler levers, which when dropping into perforations in perforated cards complete the circuit of the respective magnet 17 by means of a contact in a well-known manner. If, for example, the circuit of the electromagnet 17 coordinated to the value 8 is completed, this magnet attracts its armature 16 and moves the forked lever 15 with the arm 19 and the nose 20 towards the left. The nose 20 slides out of the recess 21 of the clutch member 3. Immediately afterwards the clutch teeth 11 of the clutch member 12 come into engagement with the clutch teeth 5 of the clutch member 3. If the value 8 to be transmitted is positive, the electromagnet 35 is not energized, so that the forked lever 33 under the action of the spring 36 puts the coupling member 30, through the respective clutch teeth, in engagement with the spur wheel 29 and the spindle 2 is driven through the spur wheels 28, 25 in the same direction of rotation as the continuously revolving spindle 26. The member 3 coupled with the spindle 2 by the clutch member 12 is thus rotated by the shaft 2 and is with its teeth 4 (8 in number) thrown into engagement with the pinion 6. This pinion is thus advanced by eight teeth and moves the counting mechanism 10 through the spur wheels 7, 8 and 9 by a corresponding amount. After the last of the eight teeth 4 has come out of engagement with the pinion, the transmission of the motion from the spindle 2 to the shaft 6a and the counting mechanism 10 ceases. The member 3 continues to move, however.

It is desirable that the magnet 17 remain energized for a short time only, and not during the entire transferring operation, since the card being sensed by the "feelers" must be shifted immediately after one sensing operation in order that a new column or new line of the card may be brought into operative relation to the feelers. It will be understood that the magnet 17 becomes de-energized as soon as its circuit is broken by the corresponding feeler coming out of registry with a perforation of the card. The purpose of the parts 19, 20, 21 is to maintain a clutch connection between the members 3 and 12 even after the magnet 17 has become de-energized. As soon as the member 3 begins to rotate, the nose 20, which originally rested in the recess 21, is drawn by the spring 18 against the end or face of the member 3, and thus (even if the magnet is deenergized) keeps the clutch member 12 in engagement with the clutch teeth 5 of the member 3 until the latter has made an entire revolution, to bring the nose 20 into registry again with the recess 21, when the spring 18 will pull said nose into such recess and thereby both lock the member 3 in its initial position and disengage the clutch member 12 from the clutch teeth 5, so that the spindle 2 no longer drives the member 3. The parts 3 to 5 and 11 to 16 take up again the position in which no transmission of motion takes place from the spindle 2 to the pinion 6. In the position of rest the teeth 4 of all the members 3 are out of engagement with the pinion 6.

If a value represented by a combination of two or more of the values 1, 2, 4, 8 is to be transmitted to the counting mechanism 10, the circuits of two or more electromagnets 17 are simultaneously completed by the feeler levers and these magnets attract their armatures. The respective coupling or clutch members 3 are then coupled with the spindle 2. By comparing Figs. 2 to 5 with each other, it will be noted that the teeth 4 are placed differently on the several toothed members 3, so that if all of these members should be coupled simultaneously with the shaft 2 (as they would be in the case of the combination value 15=8+4+2+1) they would come into mesh successively with the pinion 6. It will also be noted that the teeth 4 will come out of mesh with the pinion 6 before the respective members 3 reach their position of rest shown in Figs. 2 to 5. If, for instance, the value 9 (represented by the combination 8+1) is to be transmitted, the two magnets 17 shown at the extreme left and at the extreme right respectively of Fig. 1 will be energized simultaneously by means of the "feelers" cooperating with corresponding perforations in the card. It will be obvious that upon the energizing of said two magnets, the members 3 at the extreme left and at the extreme right of Fig. 1 (having eight teeth and one tooth respectively) will be coupled with the shaft 2. Assuming the shaft 2 to be rotating contraclockwise in Figs. 2 to 5, (member 30 clutched to spur wheel 29) it will be evident that in the case under consideration the member 3 having eight teeth 4 (see Fig. 2) will first come into mesh with the pinion 6 and give it a partial rotation corresponding to eight units. Then (for a period corresponding to about one-quarter revolution of the shaft 2, in the example under consideration) both the member 3 shown in Fig. 2 and the one shown in Fig. 5 would rotate without their teeth being in mesh with the pinion 6. After this interval, the tooth 4 of the member 3 at the extreme right of Fig. 1 (which is the member 3 shown in Fig. 5) will mesh with the pinion 6 and rotate it a distance corresponding to one unit. The pinion 6 has thus received a rotation corresponding to 8+1=9 units. During the further rotation of said two members (to their initial positions shown in Figs. 2 and 5) the pinion 6 remains stationary, since the teeth 4 of both of said members are out of mesh with said pinion at that time. The counting mechanism 10 will therefore be stepped or advanced by nine units, in the particular case considered. The arresting and locking of both members 3 then takes place again after completion of one revolution in the manner described above.

Figs. 2 to 5 show clearly that in the normal or initial position, the teeth 4 of the several members 3 occupy different positions or sectors on the periphery of said members, so that if two or more of these members are thrown into action, they will operate on the toothed spindle 6 successively and not simultaneously.

If the values to be transmitted are negative, the counting mechanism 10 and therefore the pinion 6 and the mutilated spur gears 3 must of course be operated in the direction opposite to the one employed when positive values are transmitted; in other words, the direction in which the shaft 2 rotates must be reversed. In order to effect such reversal automatically, the card, in addition to the perforations controlling (through feelers) the circuits of the magnets 17, is provided, at points where negative values are to be registered, with perforations located in a separate field or column, such additional perforations co-operating, in the well-known manner, with a feeler controlling the circuit of the electromagnet 35. When this additional feeler drops into such a perforation, it closes the circuit of the magnet 35 and shifts the coupling member 30 into the position illustrated in Fig. 1, causing the shaft 2 to rotate in the opposite direction to the shaft 26. Therefore, the mutilated gears 3 will then be rotated in the opposite direction, to reverse correspondingly the rotation of the pinion 6 and the operation of the counting mechanism 10, to cause the latter to perform subtraction, assuming that such mechanism functions additively when the shafts 2 and 26 rotate in the same direction. As stated above, the shaft 26 rotates continuously in the same direction. I wish to repeat that I do not intend to operate the apparatus in such a manner as to carry the indications of the counting mechanism through zero.

Instead of the counting mechanism 10 any other control levers or control segments of tabulating or registering or other evaluating machines of the perforated card system may be driven or adjusted by the control mechanism according to my invention.

In connection therewith the number of the gear members 3 to 5 and 11 to 13 mounted on the same shaft may be adapted to individual cases occurring in practice and be increased or reduced as desired. Each set or group of these operating means may equally well be mounted on a separate spindle 2 and be distributed over the circumference of the pinion 6 or a corresponding toothed wheel.

Various modifications and changes may be made without departing from the spirit and scope of the invention, and I desire, therefore, that only such limitations shall be placed thereon as are imposed by the prior art.

I claim as my invention:

In a control device of the character described, an actuated mechanism, a series of gear wheels, graduated as to the number of their teeth, co-operating with said actuated mechanism and adapted to impart thereto motions of different extent, each of said wheels having a recess, a clutch associated with each gear wheel and adapted, when engaged, to rotate such gear wheel, a locking member for each gear wheel, arranged to enter said recess and to lock such gear wheel in its initial position after the wheel has performed one complete revolution, said locking member being operatively connected with the respective clutch to bring such clutch into the disengaged condition by the movement of the locking member into locking position in the initial position of the corresponding gear wheel.

In testimony whereof I affix my signature.

PAUL MANSEL.